US012530609B2

(12) United States Patent
Griffin et al.

(10) Patent No.: US 12,530,609 B2
(45) Date of Patent: Jan. 20, 2026

(54) REAL-TIME QUBIT INFORMATION SERVICE

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 525 days.

(21) Appl. No.: 18/173,533

(22) Filed: Feb. 23, 2023

(65) Prior Publication Data

US 2024/0289661 A1 Aug. 29, 2024

(51) Int. Cl.
*G06N 10/20* (2022.01)
*G06N 10/70* (2022.01)

(52) U.S. Cl.
CPC ............. *G06N 10/20* (2022.01); *G06N 10/70* (2022.01)

(58) Field of Classification Search
CPC ................................ G06N 10/20; G06N 10/70
See application file for complete search history.

(56) References Cited

U.S. PATENT DOCUMENTS

| 11,360,924 | B1 * | 6/2022 | Griffin | ................ G06F 13/4068 |
| 11,789,907 | B2 * | 10/2023 | Coady | .................... G06N 10/00 707/821 |
| 12,373,724 | B1 * | 7/2025 | Fowler | ................... G06N 10/70 |
| 2019/0138924 | A1 | 5/2019 | Cames | |
| 2020/0201655 | A1 * | 6/2020 | Griffin | .................. G06F 9/4494 |
| 2021/0034411 | A1 * | 2/2021 | Griffin | ................... G06N 5/025 |
| 2021/0334237 | A1 | 10/2021 | Coady et al. | |
| 2021/0357186 | A1 * | 11/2021 | Griffin | .................. G06N 10/80 |
| 2021/0374583 | A1 * | 12/2021 | Griffin | .................. G06N 10/80 |
| 2021/0406748 | A1 * | 12/2021 | Coady | ................ G06F 16/1734 |
| 2022/0051121 | A1 * | 2/2022 | Griffin | .................. G06N 10/20 |
| 2022/0066985 | A1 * | 3/2022 | Griffin | ................ G06F 16/1794 |
| 2022/0237490 | A1 * | 7/2022 | Coady | .................... G06N 10/00 |
| 2022/0253742 | A1 | 8/2022 | Zheng et al. | |
| 2022/0269526 | A1 * | 8/2022 | Griffin | .................. G06N 10/80 |
| 2022/0269964 | A1 * | 8/2022 | Coady | .................. G06F 9/4843 |
| 2022/0308966 | A1 * | 9/2022 | Coady | ................ G06F 11/1469 |
| 2022/0383171 | A1 * | 12/2022 | Griffin | .................. G06F 1/3203 |
| 2022/0383172 | A1 * | 12/2022 | Griffin | .................... G06F 9/461 |
| 2023/0034075 | A1 * | 2/2023 | Griffin | .................... G06N 10/00 |

(Continued)

FOREIGN PATENT DOCUMENTS

CN 109597347 A 4/2019

*Primary Examiner* — David E Choi
(74) *Attorney, Agent, or Firm* — Dority & Manning, P.A.

(57) ABSTRACT

A quantum computing device determines quantum characteristics of a quantum computing system, wherein the quantum characteristics comprise properties of qubits of the quantum computing system. The quantum computing device stores in a time series database information containing the quantum characteristics of the quantum computing system. The quantum computing device categorizes the information in the time series database, wherein the categorized information is associated with the qubits. The quantum computing device obtains from the time series database via an application programming interface (API) the categorized information. The quantum computing device presents on a display device real-time information about the quantum computing system based on the categorized information.

20 Claims, 11 Drawing Sheets

(56) References Cited

U.S. PATENT DOCUMENTS

| | | | |
|---|---|---|---|
| 2023/0153148 A1* | 5/2023 | Griffin | G06N 10/70 |
| | | | 718/102 |
| 2023/0196171 A1* | 6/2023 | Griffin | G06N 10/60 |
| | | | 703/26 |
| 2023/0244971 A1* | 8/2023 | Griffin | G06N 10/00 |
| | | | 706/62 |
| 2023/0274178 A1* | 8/2023 | Griffin | G06F 11/3636 |
| | | | 706/62 |
| 2023/0351240 A1* | 11/2023 | Griffin | G06N 10/20 |
| 2024/0289661 A1* | 8/2024 | Griffin | G06N 10/70 |
| 2025/0124325 A1* | 4/2025 | Kanta | G06N 10/60 |
| 2025/0200413 A1* | 6/2025 | Griffin | G06N 10/40 |
| 2025/0238699 A1* | 7/2025 | Šimkovic | G06N 10/20 |

* cited by examiner

REAL-TIME QUBIT INFORMATION SERVICE

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately determine and view qubit information in real-time will be desirable.

SUMMARY

The examples disclosed herein implement a real-time qubit information service that performs viewing of real-time qubit information. In particular, the real-time qubit information service can determine characteristics of a quantum computing system, such as the properties of qubits of the quantum computing system, and store and categorize the characteristics in a database. The real-time qubit information service can expose the characteristic information that is in the database, such as by an application programming interface (API), and provide a real-time, live view into the characteristics of the quantum computing system. As a result, problems in the quantum computing system can be easily and quickly diagnosed and resource strains can be immediately remedied.

In one example, a method for viewing real-time qubit information is disclosed. The method includes determining, by a quantum computing device, one or more quantum characteristics of a quantum computing system, wherein the one or more quantum characteristics comprise one or more properties of one or more qubits from among a plurality of qubits of the quantum computing system. The method further includes storing, by the quantum computing device in a time series database, information containing the one or more quantum characteristics of the quantum computing system. The method further includes categorizing, by the quantum computing device, the information in the time series database, wherein the categorized information is associated with the one or more qubits. The method further includes obtaining, by the quantum computing device from the time series database via an application programming interface (API), the categorized information. The method further includes presenting, by the quantum computing device on a display device, real-time information about the quantum computing system based on the categorized information.

In another example, a quantum computing device for viewing real-time qubit information is disclosed. The quantum computing device comprises a system memory, and a processor device communicatively coupled to the system memory. The processor device is to determine one or more quantum characteristics of a quantum computing system, wherein the one or more quantum characteristics comprise one or more properties of one or more qubits from among a plurality of qubits of the quantum computing system. The processor device is further to store, in a time series database, information containing the one or more quantum characteristics of the quantum computing system. The processor device is further to categorize the information in the time series database, wherein the categorized information is associated with the one or more qubits. The processor device is further to obtain, from the time series database via an application programming interface (API), the categorized information. The processor device is further to present, on a display device, real-time information about the quantum computing system based on the categorized information.

In another example, a non-transitory computer-readable storage medium is disclosed. The non-transitory computer-readable storage medium stores thereon computer-executable instructions that, when executed, cause one or more processor devices to determine one or more quantum characteristics of a quantum computing system, wherein the one or more quantum characteristics comprise one or more properties of one or more qubits from among a plurality of qubits of the quantum computing system. The instructions further cause the processor device to store, in a time series database, information containing the one or more quantum characteristics of the quantum computing system. The instructions further cause the processor device to categorize the information in the time series database, wherein the categorized information is associated with the one or more qubits. The instructions further cause the processor device to obtain, from the time series database via an application programming interface (API), the categorized information. The instructions further cause the processor device to present, on a display device, real-time information about the quantum computing system based on the categorized information.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
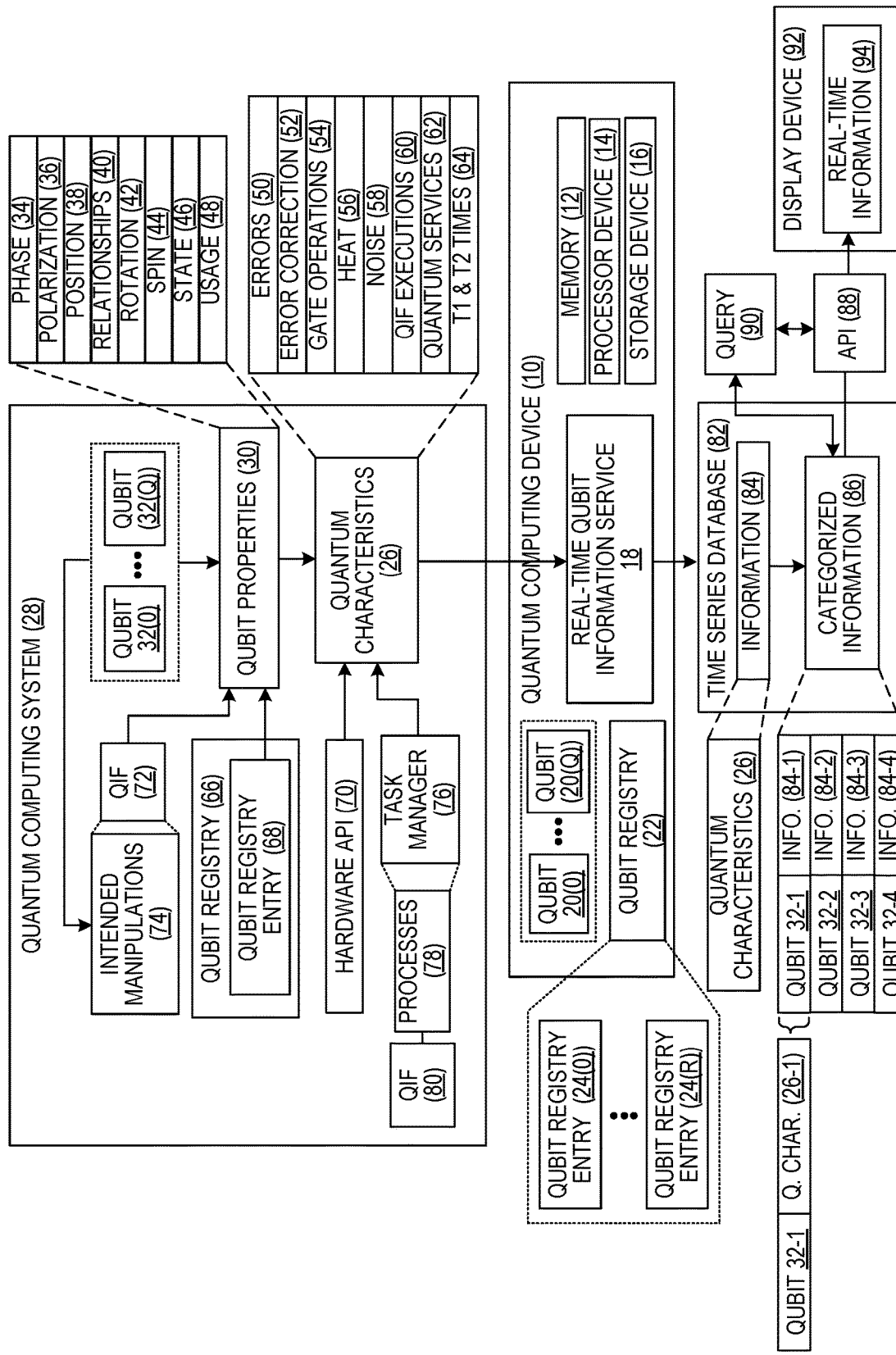
FIG. 1 is a block diagram of a quantum computing device in which examples of viewing real-time qubit information may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Quantum computing environments have properties that differ from properties of classical computing environments and need to be monitored in order to ensure that the quantum computing environment is functioning properly. For instance, the qubits in a quantum computing environment have properties, such as spin and polarization, that need to be easily recorded and viewed in order for potential issues in the quantum computing environment to be diagnosed and to reduce resource strains in the quantum computing environment.

A real-time qubit information service can provide a mechanism for easily recording and viewing qubit properties and other characteristics of a quantum computing environment or system. The real-time qubit information service can determine characteristics of a quantum computing system, such as the properties of the qubits of the quantum computing system, and store and categorize the characteristics in a database. The real-time qubit information service can expose the characteristic information that is in the database, such as by using an application programming interface (API), and provide a real-time, live view into the characteristics of the quantum computing system. The real-time live view allows for a user or computing system to ascertain whether the qubits of the quantum computing system are performing as intended and take the appropriate actions, such as setting alerts or monitoring the quantum computing system. As a result, any issues in the quantum computing system can be easily and quickly diagnosed and resolved, thereby reducing resource strains and other problems in the quantum computing system.

For instance, the real-time qubit information service can determine the physical properties of the qubits of a quantum computing system by accessing a qubit registry, reading a quantum instruction file and the intended manipulations of the qubits based on the instructions in the quantum instruction file, accessing a task manager, and from error correcting actions, as non-limiting examples. Other characteristics of the quantum computing system that impact the qubits, such as errors, heat, and noise, as non-limiting examples, can also be determined by the real-time qubit information service.

The information about the physical properties of the qubits and other characteristics of the quantum computing system can be stored and categorized in a time series database, such as by linking the information to specific qubits in the quantum computing system. The information can be periodically collected, and quantum safety can be ensured while accessing qubits in entangled scenarios. The real-time qubit information service can expose this categorized information via an API or in any other time series manner in order to present the categorized information in real-time.

The categorized information can be presented as a real-time, live view into the quantum computing system in a variety of manners, such as on a display device with graphs that display metrics and properties of qubits and in tables of categorized information that show correlations between the qubits, as non-limiting examples. Additionally, the categorized information in the time-series databased can be queried and obtained in order to be used in a variety of diagnostic and analytics manners. Quantum models can also demonstrate correlations between each data point in order to better understand how each permutation can affect each other. In some implementations, real-time changes in the quantum computing system can be made automatically by the real-time qubit information service based on the categorized information in order to remedy any issues in the quantum computing system and provide for better performance of the quantum computing system. For instance, quantum algorithms can be applied to train machine learning models and quantum algorithms to better understand the data and what the data means for the hardware of the quantum computing system. The state of a quantum algorithm's intended execution and manipulation can also be inferred and compared to the actual execution of the quantum algorithm so that the changes between the intended and actual execution can be learned and a quantum algorithm can be updated to compensate for the changes. As a result, degradation of performance of the quantum computing system can be quickly determined and remedied.

FIG. 1 is a block diagram of a quantum computing device 10 that comprises a system memory 12, a processor device 14, and a storage device 16. It is to be understood that the quantum computing device 10 in some examples may include constituent elements in addition to those illustrated in FIG. 1. In the example of FIG. 1, the quantum computing device 10 implements a real-time qubit information service 18 that performs real-time qubit information viewing.

In the example of FIG. 1, the quantum computing device 10 implements a set of one or more qubits 20(0)-20(Q) for use by quantum services executed by the quantum computing device 10. To maintain information for the qubits 20(0)-20(Q), the quantum computing device 10 includes a qubit registry 22, which comprises a plurality of qubit registry entries 24(0)-24(R) each corresponding to a qubit such as the one or more qubits 20(0)-20(Q). The qubit registry 22 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries 24(0)-24(R) of the qubit registry 22 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services. A quantum service (not illustrated) is a process that employs qubits such as the one or more qubits 20(0)-20(Q) to provide desired functionality. Execution of quantum services is facilitated by a quantum service manager (not illustrated) and a quantum service scheduler (not illustrated). The quantum service manager of the quantum computing device 10 handles operations for creating, monitoring, and terminating quantum services, while the quantum service scheduler of the quantum computing device 10 controls the scheduling of quantum services for execution by the processor device 14, and allocation of processing resources to executing quantum services. The functionality of the quantum service manager and the quantum service scheduler may be made accessible to other processes (e.g., via a defined application programming interface (API), as a non-limiting example).

The real-time qubit information service 18 may determine one or more quantum characteristics 26 of a quantum computing system 28. The quantum characteristics 26 can include one or more qubit properties 30. The qubit properties 30 may be physical properties of one or more qubits 32(0)-32(Q) of the quantum computing system 28. In some implementations, the qubit properties 30 may be physical properties of one or more of the qubits 20(0)-20(Q) of the quantum computing device 10. Non-limiting examples of the qubit properties 30 include phase 34, polarization 36, position 38, relationships 40 between the qubits, rotation 42, spin 44, state 46, and usage 48 of one or more of the qubits 32(0)-32(Q) of the quantum computing system 28 or one or more of the qubits 20(0)-20(Q) of the quantum computing device 10. Other quantum characteristics 26 of the quantum computing system 28 that the real-time qubit information service 18 may determine include errors 50 in the quantum computing system 28, error correction 52, gate operations 54, heat 56, noise 58, quantum instruction file executions 60, quantum services 62, and T1 and T2 times 64, as non-limiting examples. In some implementations, the quantum characteristics 26 may be quantum characteristics, such as errors, error correction, gate operations, heat, noise, quantum instruction file executions, quantum services, and T1 and T2 times, of the quantum computing device 10 or a quantum computing device in the quantum computing system 28.

For example, a qubit 32-1 from among the qubits 32(0)-32(Q) may be put through a gate (e.g., gate operation 54) and the real-time qubit information service 18 can determine the qubit properties 30 for the qubit 32-1 and the qubits 32(0)-32(Q) of the quantum computing system 28, as the gate operation 54 can change the qubit properties 30 of the qubit 32-1 that was put through the gate and the qubits 32(0)-32(Q) of the quantum computing system 28, such as a phase change or a rotation change of a qubit. The quantum characteristics 26 can include the qubit properties 30 of the qubit 32-1 and the qubits 32(0)-32(Q) as a result of the gate operation 54. The quantum characteristics 26 can also include other characteristics of the quantum computing system 28 as a result of the gate operation 54, such as the errors 50, the heat 56, and the noise 58 of the quantum computing system 28, as non-limiting examples, as well as the gate operation 54 that was performed. Interactions and relationship between the qubits 32(0)-32(Q) of the quantum computing system 28 can also be determined as a result of the gate operation 54. As one example, the qubit properties 30 can include the relationships 40 between the qubit 32-1 that was put through the gate and the qubits 32(0)-32(Q) of the quantum computing system 28.

In order to determine the quantum characteristics 26 of the quantum computing system 28, the real-time qubit information service 18 may receive the qubit properties 30 from a qubit registry 66 of the quantum computing system 28. The qubit registry 66 may be a component of a quantum computing device in the quantum computing system 28. For instance, a qubit registry entry 68 of the qubit registry 66 may correspond to a qubit from among the qubits 32(0)-32(Q) of the quantum computing system 28 and contain metadata that includes the physical properties of the qubit, such as the phase, polarization, position, relationship to other qubits, rotation, spin, state, or usage of the qubit, as non-limiting examples. The real-time qubit information service 18 can receive such information from the qubit registry entry 68 of the qubit registry 66 in order to determine the quantum characteristics 26 of the quantum computing system 28, where the quantum characteristics 26 include the properties of the qubit that the qubit registry entry 68 corresponds to.

In another example, the real-time qubit information service 18 may determine the quantum characteristics 26 of the quantum computing system 28 by receiving the quantum characteristics 26 from a hardware application programming interface (API) 70 in the quantum computing system 28. The hardware API 70 may be included in a quantum computing device of the quantum computing system 28. Additionally, there may be one or more of the hardware API 70 in the quantum computing system 28, such as a hardware API on a first quantum computing device in the quantum computing system 28 and a hardware API on a second quantum computing device in the quantum computing system 28, or more than one hardware API on a first quantum computing device. For example, the hardware API 70 may provide information about the heat 56 of the quantum computing system 28, an interaction that was performed in the quantum computing system 28, decoherence in the quantum computing system 28 based on T1 and T2 times 64, and any available error correcting software and other software that can be deployed, as non-limiting examples. The information provided by the hardware API 70 can be included in the quantum characteristics 26.

In some implementations, the real-time qubit information service 18 may determine the quantum characteristics 26 of the quantum computing system 28 by obtaining a quantum instruction file 72 and determining, based on the quantum instruction file 72, intended manipulations 74 of one or more of the qubits 32(0)-32(Q) of the quantum computing system 28. The qubit properties 30 can be based on the intended manipulations 74 from the quantum instruction file 72, and the quantum characteristics 26 can include the qubit properties 30 based on the intended manipulations 74. The quantum instruction file 72 may include instructions for a quantum computing device in the quantum computing system 28 to execute, which may indicate the intended manipulations 74 of qubits of the quantum computing system 28 when the quantum instruction file 72 is executed. For example, the real-time qubit information service 18 may obtain the quantum instruction file 72 and read the instructions of the quantum instruction file 72 to determine the intended manipulations 74 of qubit 32-1 from among the qubits 32(0)-32(Q). The intended manipulations 74 of the qubit 32-1 may be a phase change, polarization, position, rotation, spin, state, or any of the qubit properties 30, as non-limiting examples, in the qubit 32-1 as a result of an execution of one or more instructions in the quantum instruction file 72. The qubit properties 30 can include the intended manipulations 74 of the qubit 32-1, and the quantum characteristics 26 can include the intended manipulations 74 of the qubit 32-1.

In another example, the real-time qubit information service 18 may determine the quantum characteristics 26 of the quantum computing system 28 by obtaining, from a task manager 76 of the quantum computing system 28, one or more processes 78 of a quantum computing device in the quantum computing system 28. The task manager 76 can be a component of a quantum computing device in the quantum computing system 28. The processes 78 can indicate one or more locations in the lifecycle of the execution of a quantum instruction file 80. For instance, the quantum instruction file 80 may contain multiple instructions for a quantum computing device in the quantum computing system 28 to execute and the instructions may be executed by the processes 78 identified by the task manager 76, so the processes 78 can identify a location in the execution of the instructions of the quantum instruction file 80.

The real-time qubit information service 18 may store, in a time series database 82, information 84 that contains the quantum characteristics 26 of the quantum computing system 28. The time series database 82 can be implemented in a classical computing environment using classical computing features or in a quantum computing environment. In some implementations, the information 84 can be exported from the quantum computing environment to a classical computing environment, such as to a traditional SQL database or other type of database or storage medium, via a quantum channel. In other implementations, the information 84 can be stored in a storage device, such as a hard disk drive, or another data storage component of a classical or quantum computing system.

The real-time qubit information service 18 may categorize the information 84 in the time series database 82, resulting in categorized information 86 in the time series database 82. The categorized information 86 can be associated with one or more of the qubits 32(0)-32(Q) of the quantum computing system 28. The categorized information 86 may be presented in the time series database 82 in a tabular format that shows the relationship between the qubits 32(0)-32(Q) and the information 84. For instance, the categorized information 86 in the time series database 82 may include a row for qubit 32-1 that includes the information 84-1 associated with qubit 32-1. The information 84-1 can include quantum characteristics 26-1 of the qubit 32-1, which can include the qubit properties 30 of the qubit 32-1, such as one or more of the phase 34, the polarization 36, the position 38, the rotation 42, the spin 44, the state 46, and the usage 48 of the qubit 32-1, or the errors 50, the heat 56, and the noise 58 of the quantum computing system 28 of the qubit 32-1, as non-limiting examples. Similarly, the categorized information 86 in the time series database 82 can include a row for each qubit from among the qubits 32(0)-32(Q) (e.g., qubit 32-2, qubit 32-3, qubit 32-4) of the quantum computing system 28 that associates the qubit to the information 84 for the qubit (e.g., information 84-2, information 84-3, information 84-4).

The real-time qubit information service 18 can obtain the categorized information 86 from the time series database 82 via an application programming interface (API) 88. The categorized information 86 in the time series database 82 can be exposed via the API 88 in order for a user or a classical or quantum computing system to read or analyze the categorized information 86. The data in the time series database 82 (e.g., information 84) can be periodically collected and the API 88 can be called periodically in order to obtain current, real-time information and categorized information 86 from the time series database 82. In some implementations, the categorized information 86 can be obtained from the time series database 82 via the API 88 by sending a query 90 to the time series database 82 in order retrieve the categorized information 86. The real-time qubit information service 18 can then receive the categorized information 86 that was obtained from the query 90 to the time series database 82. For instance, a user or the real-time qubit information service 18, via the API 88 (e.g., via a GET request) or another requesting method, can send the query 90 to the time series database 82 to get the categorized information 86. In some implementations, a user of the quantum computing system 28 can send the query 90 to the time series database 82 to obtain the categorized information 86, then the user can analyze the categorized information 86, find correlations, and make changes to the quantum computing system 28 as a result.

The real-time qubit information service 18 can present, on a display device 92, real-time information 94 about the quantum computing system 28 based on the categorized information 86, which was obtained from the time series database 82 via the API 88. The real-time information 94 can include the categorized information 86 associated with each qubit from among the qubits 32(0)-32(Q), such as the qubit properties 30 for each qubit and the quantum characteristics 26 of the quantum computing system 28. The real-time information 94 can include statistics and reports based on the categorized information 86 to accurately visualize the activity and properties of the quantum computing system 28. The real-time qubit information service 18 can be continuously running, so the information 84 that is categorized in the categorized information 86 can be collected and presented on the display device 92 in real-time as the real-time information 94. The display device 92 can present the real-time information 94 about the quantum computing system 28 in various manners, such as in a dashboard, graphs, tables, or in any other manner that allows for the analysis of the real-time information 94 by a user or computing device. As a result, a user or computing device can monitor the quantum computing system 28, examine data points, observe bottlenecks or resource constraints, and ensure consistent execution of the components of the quantum computing system 28 in real-time.

It is to be understood that, because the real-time qubit information service 18 is a component of the quantum computing device 10, functionality implemented by the real-time qubit information service 18 may be attributed to the quantum computing device 10 generally. Moreover, in examples where the real-time qubit information service 18 comprises software instructions that program the processor device 14 to carry out functionality discussed herein, functionality implemented by the real-time qubit information service 18 may be attributed herein to the processor device 14. It is to be further understood that while, for purposes of illustration only, the real-time qubit information service 18 is depicted as a single component, the functionality implemented by the real-time qubit information service 18 may be implemented in any number of components, and the examples discussed herein are not limited to any particular number of components.

Figure 2:
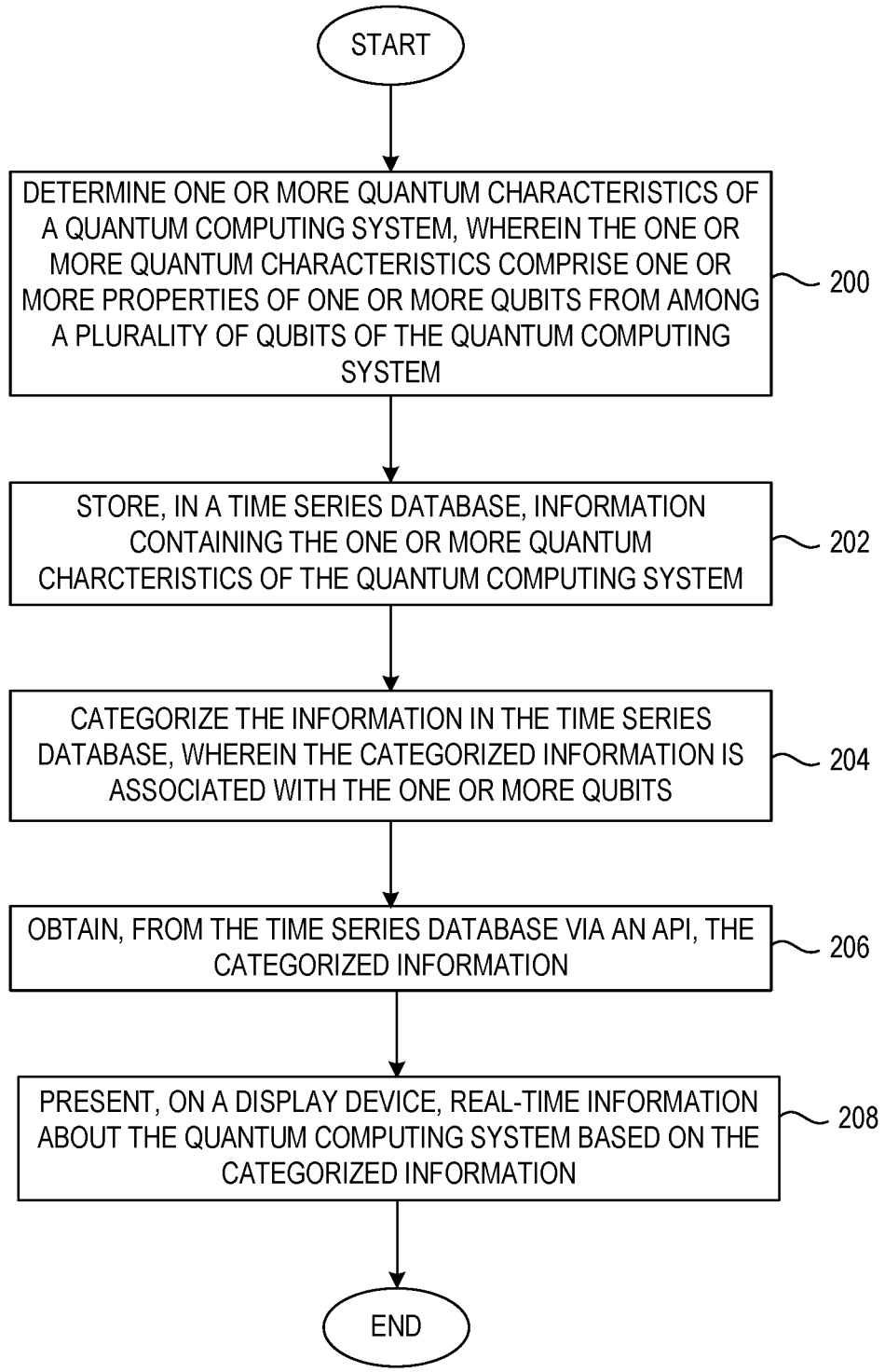
FIG. 2 is a flowchart illustrating operations performed by the quantum computing device of FIG. 1 for viewing real-time qubit information, according to one example.

FIG. 2 is a flowchart illustrating operations performed by the quantum computing device of FIG. 1 for viewing real-time qubit information, according to one example. Elements of FIG. 1 are referenced in describing FIG. 2 for the sake of clarity. In the example of FIG. 2, operations begin with a processor device of a quantum computing device, such as the processor device 14 of the quantum computing device 10 of FIG. 1, determining one or more quantum characteristics of a quantum computing system, wherein the one or more quantum characteristics comprise one or more properties of one or more qubits from among a plurality of qubits of the quantum computing system (block 200). The processor device 14 then stores, in a time series database, information containing the one or more quantum characteristics of the quantum computing system (block 202). The processor device 14 then categorizes the information in the time series database, wherein the categorized information is associated with the one or more qubits (block 204). The processor device 14 then obtains from the time series database via an application programming interface (API), the categorized information (block 206). The processor device 14 then presents on a display device, real-time information about the quantum computing system based on the categorized information (block 208).

Figure 3:
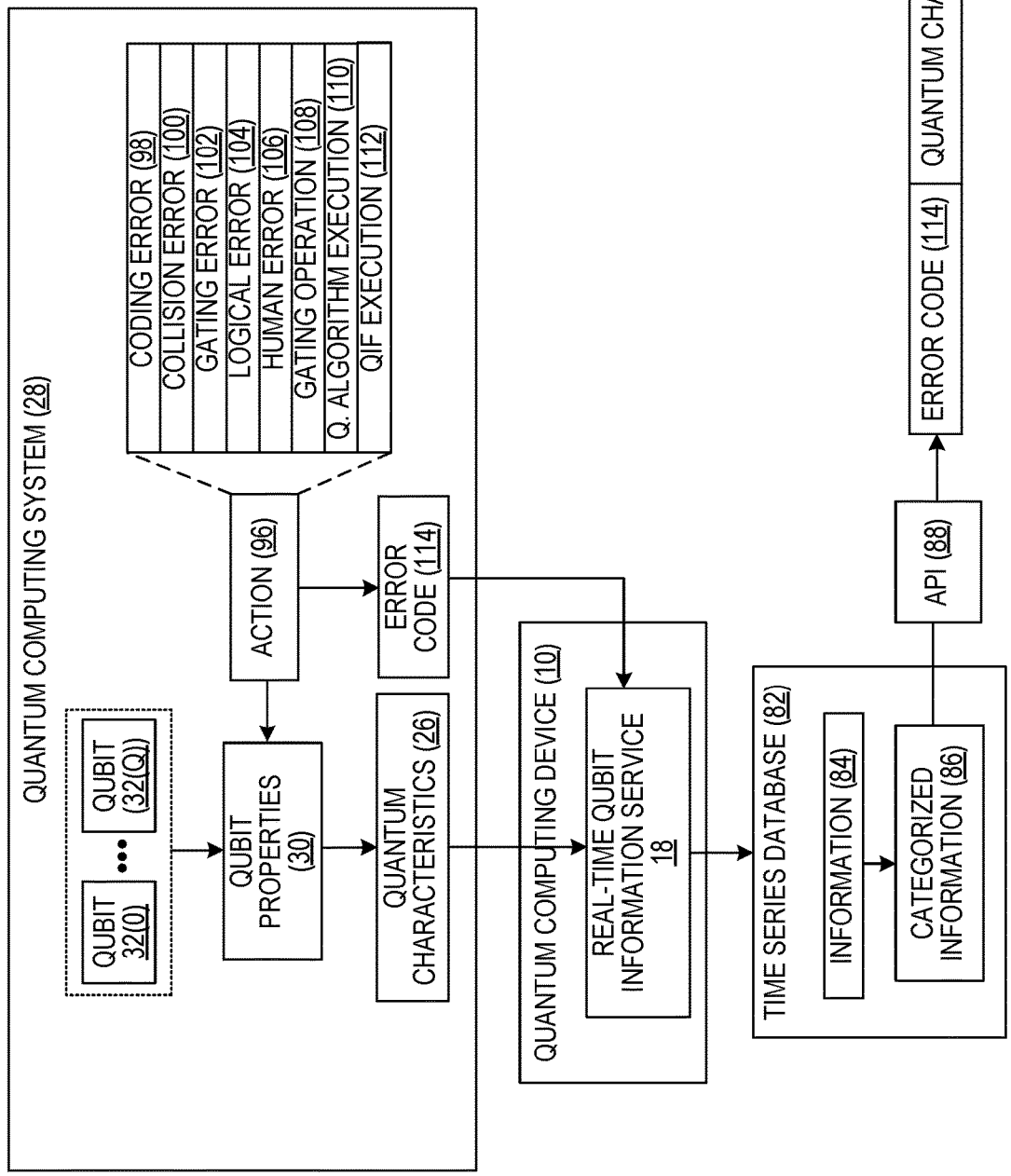
FIG. 3 is a block diagram of the quantum computing device of FIG. 1 for viewing real-time qubit information, according to one example.

FIG. 3 is a block diagram of the quantum computing device of FIG. 1 for viewing real-time qubit information, according to one example. Elements of FIG. 1 are referenced in describing FIG. 3 for the sake of clarity. In the example of FIG. 3, the real-time qubit information service 18 may determine that an action 96 occurred in the quantum computing system 28. In some examples, the real-time qubit information service 18 may determine that the action 96 occurred in a quantum computing device of the quantum computing system 28. The information 84 in the time series database 82 can contain the qubit properties 30 as a result of the action 96.

The action 96 may include a coding error 98, a collision error 100, a gating error 102, a logical error 104, a human error 106, a gating operation 108, a quantum algorithm execution 110, or a quantum instruction file execution 112 in the quantum computing system 28 or a quantum computing device in the quantum computing system 28, as non-limiting examples. For example, the real-time qubit information service 18 can determine that a logical error 104 occurred in the quantum computing system 28. The logical error 104 can affect the qubit properties 30 of one or more of the qubits 32(0)-32(Q) of the quantum computing system 28 or another quantum characteristic 26 of the quantum computing system 28. The real-time qubit information service 18 can determine the quantum characteristics 26 of the quantum computing system 28, which can include the qubit properties 30, after the logical error 104 occurred, so the information 84 stored in the time series database 82 can include the qubit properties 30 and the quantum characteristics 26 of the quantum computing system 28 as a result of the logical error 104. For example, the action 96 may be the gating operation 108, which may occur as a result of the quantum instruction file execution 112. The gating operation 108 may be performed on a qubit 32-1 from among the qubits 32(0)-32(Q), which may change the qubit properties 30 of the qubit 32-1. The real-time qubit information service 18 can determine that the gating operation 108 occurred, determine the qubit properties 30 of qubit 32-1 and the quantum characteristics 26 of the quantum computing system 28 as a result of the gating operation 108, and store the quantum characteristics 26 in the information 84 in the time series database 82.

The time series database 82 can also include the information 84 from before the action 96 occurred, so the qubit properties 30 from before the action 96 and after the action 96 can be examined by a user or computing device to make appropriate changes to the quantum computing system 28 in order to reduce any issues that occurred as a result of the action 96. For example, the gating operation 108 may be performed on a qubit 32-1 from among the qubits 32(0)-32(Q), which may change the qubit properties 30 of the qubit 32-1 that can be included in the quantum characteristics 26. The information 84 in the time series database 82 may include the quantum characteristics 26 that correspond to the qubit 32-1 from before the gating operation 108 and after the gating operation 108. The information 84 can be analyzed in order to determine any changes to be made, such as changing the gates, a quantum algorithm, or a quantum instruction file, as non-limiting examples, if there is a degradation in performance or resource constraint due to the gating operation 108, for example.

The real-time qubit information service 18 may receive an error code 114 that corresponds to the action 96 that occurred in the quantum computing system 28 or a quantum computing device in the quantum computing system 28, where the action 96 is an error in the quantum computing system 28 or an error in a quantum computing device in the quantum computing system 28. For instance, if the action 96 is the gating error 102, then the real-time qubit information service 18 may receive the error code 114 that corresponds to the gating error 102 that occurred. The real-time qubit information service 18 may obtain the categorized information 86 from the time series database 82 via the API 88 and determine, based on the categorized information 86 and the error code 114, the quantum characteristics 26 of the quantum computing system 28 where the error occurred.

The error code 114 can correspond to the quantum characteristics 26, such as to the quantum characteristics 26 that have been affected by the error (i.e., action 96). For example, the action 96 in the quantum computing system 28 may be the collision error 100, and the collision error 100 may have affected the quantum characteristics 26 of the quantum computing system 28, such as by changing a qubit property of the qubit properties 30. As a result, the information 84 and the categorized information 86 in the time series database 82 may include the quantum characteristics 26 of the quantum computing system 28 and the qubit properties 30 as a result of the collision error 100, as well as the error code 114 that corresponds to the collision error 100. The real-time qubit information service 18 can then obtain that categorized information 86 and error code 114 from the time series database 82 and determine the quantum characteristics 26 of the quantum computing system 28 as a result of the error. The error code 114 that was obtained can also be used by a user or computing device to work through a debugging chain to determine that there was a collision error 100 and the effect the collision error had on the qubits 32(0)-32(Q) and the components and characteristics of the quantum computing system 28.

Figure 4:
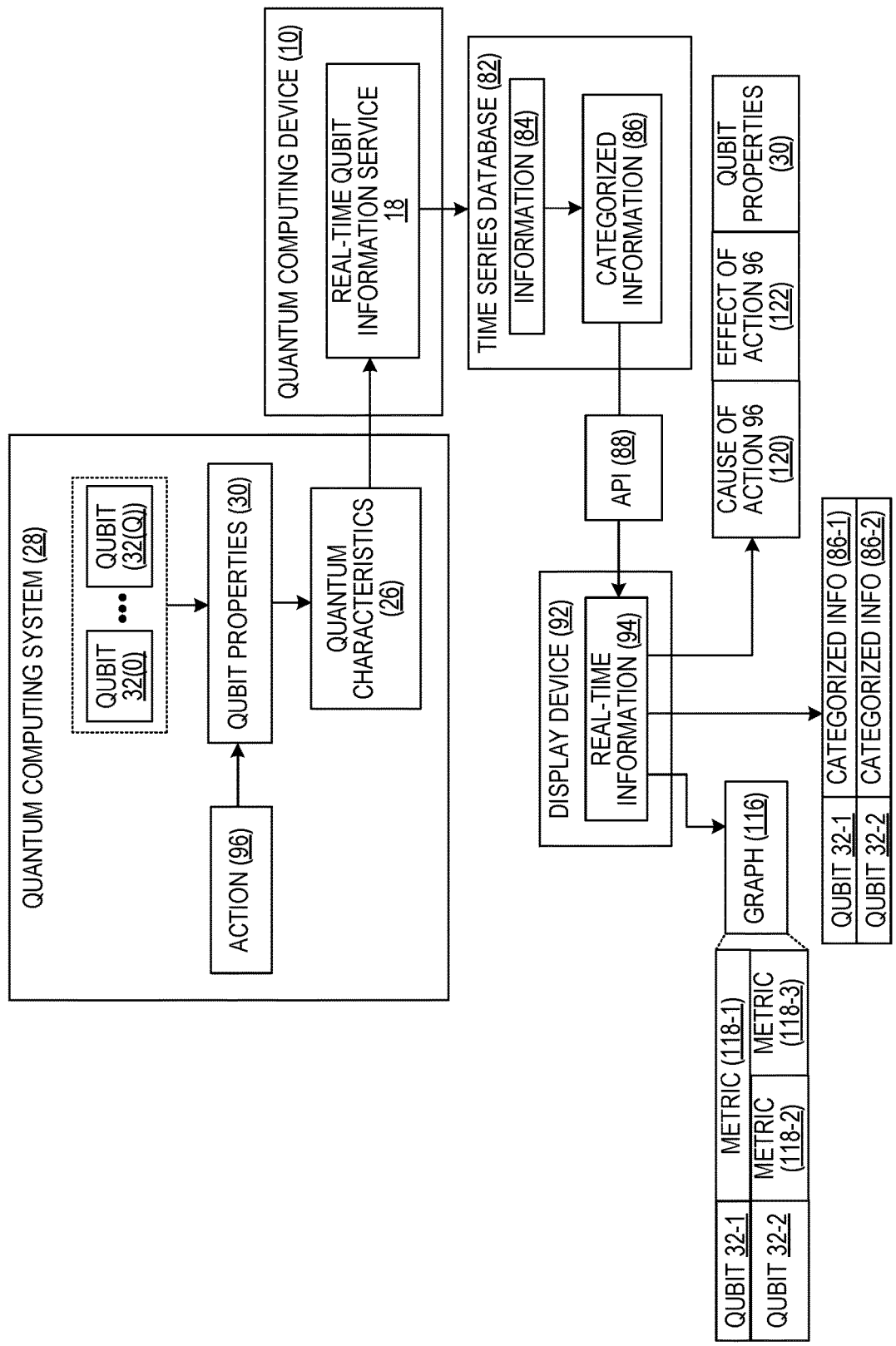
FIG. 4 is a block diagram of the quantum computing device of FIG. 1 for viewing real-time qubit information, according to one example.

FIG. 4 is a block diagram of the quantum computing device of FIG. 1 for viewing real-time qubit information, according to one example. Elements of FIG. 1 are referenced in describing FIG. 4 for the sake of clarity. In the example of FIG. 4, the real-time qubit information service 18 may present the real-time information 94 about the quantum computing system 28 on the display device 92 by creating a graph 116 that displays one or more metrics, such as metric 118-1, metric 118-2, and metric 118-3, of one or more of the qubits 32(0)-32(Q) of the quantum computing system 28. Each metric (e.g., metric 118-1, metric 118-2, metric 118-3) may correspond to one or more of the qubits 32(0)-32(Q). The metrics (e.g., metric 118-1, metric 118-2, metric 118-3) may describe the quantum characteristics 26 of the quantum computing system 28 or the qubit properties 30 of the qubits 32(0)-32(Q). The graph 116 can be one or more of a time series graph, bar chart, line graph, area graph, pie chart, column chart, or bubble chart, as non-limiting examples, that display the metrics, qubits, qubit properties, quantum characteristics, and actions in the quantum computing system 28, as non-limiting examples. The graph 116 may be displayed on a visual dashboard on the display device 92 as a part of a software application or a web-based application. The graph 116 can be used by a user or a computing system to debug, analyze, or make changes to the quantum computing system 28, as non-limiting examples. For instance, the graph 116 may display information indicating that a component of the quantum computing system 28 is not performing at an expected level, such as a quantum algorithm that is expected to perform with 99% accuracy but there are 5% errors in the quantum computing system 28, and the user or computing system can determine that there is a disconnect between the expected performance of the quantum algorithm and the actual execution of the quantum algorithm in the quantum computing system 28 and make changes to the quantum algorithm.

For example, metric 118-1 may be the polarization 36 that corresponds to qubit 32-1 at a particular time and the metric 118-1 may be displayed on the graph 116, which a user can view in order to see a real-time, live view of the polarization 36 that corresponds to qubit 32-1 in the quantum computing system 28. In another example, the metric 118-2 may be the position 38 of qubit 32-2 and the metric 118-3 may be the spin 44 of qubit 32-2 at a particular time. The metric 118-2 and the metric 118-3 can be displayed on the graph 116 as both corresponding to the qubit 32-2. In some implementations, more than one graph 116 may be presented on the display device 92. For example, the metric 118-1 that corresponds to qubit 32-1 may be displayed in a line graph, and the metric 118-2 and the metric 118-3 that both correspond to qubit 32-2 may be displayed in a bar graph, with both the line graph and the bar graph presented on the display device 92, such as in the same visual dashboard, as one example.

In another example, the real-time qubit information service 18 may present the real-time information 94 about the quantum computing system 28 on the display device 92 by presenting correlations in the categorized information 86 on the display device 92. The correlations in the categorized information 86 may include relationships between the qubits 32(0)-32(Q) of the quantum computing system 28. For instance, qubit 32-1 may relate to categorized information 86-1 and qubit 32-2 may relate to categorized information 86-2 due to an association between qubit 32-1 and categorized information 86-1 and an association between qubit 32-2 and categorized information 86-2. For example, the categorized information 86-1 may include the spin 44 of the qubit 31-1 and the categorized information 86-2 may include the rotation 42 of the qubit 31-2. The associations between the qubit 32-1 and the categorized information 86-1 and the qubit 32-2 and the categorized information 86-2 can be presented on the display device 92. The categorized information 86-1 can include information about a relationship between the qubit 32-1 and the qubit 32-2, such as the relationship 40 between the qubit 32-1 and the qubit 32-2, which can be presented on the display device 92. For example, the qubit 32-1 and the qubit 32-2 may have the relationship 40 because the qubit 32-1 and the qubit 32-2 are used by the same quantum service or are part of the same superposition set.

In another example, the real-time qubit information service 18 may present the real-time information 94 about the quantum computing system 28 on the display device 92 by presenting a cause 120 of an action that occurred in the quantum computing system 28 and an effect 122 of the action on one or more of the qubit properties 30 of one or more of the qubits 32(0)-32(Q) of the quantum computing system 28. For example, a collision error 100 may occur and information about the collision error 100, such as the error code, the cause 120 of the collision error 100, and the effect 122 of the collision error 100 on the qubits 32(0)-32(Q), the qubit properties 30, and the quantum characteristics 26 of the quantum computing system 28, as non-limiting examples, may be stored in the time series database 82 as the information 84 that is categorized in the categorized information 86. The real-time qubit information service 18 can then obtain the categorized information 86, which contains the cause 120 of the collision error 100 and the effect 122 of the collision error 100, from the time series database 82 via the API 88 and present the cause 120 of the collision error 100 and the effect 122 of the collision error 100 in the real-time information 94 on the display device 92. As a result, a user or computing device can view the cause 120 and effect 122 of the action 96 on the components of the quantum computing system 28 and make changes to improve the efficiency and accuracy of the quantum computing system, such as by making changes to a quantum algorithm to reduce errors.

Figure 5:
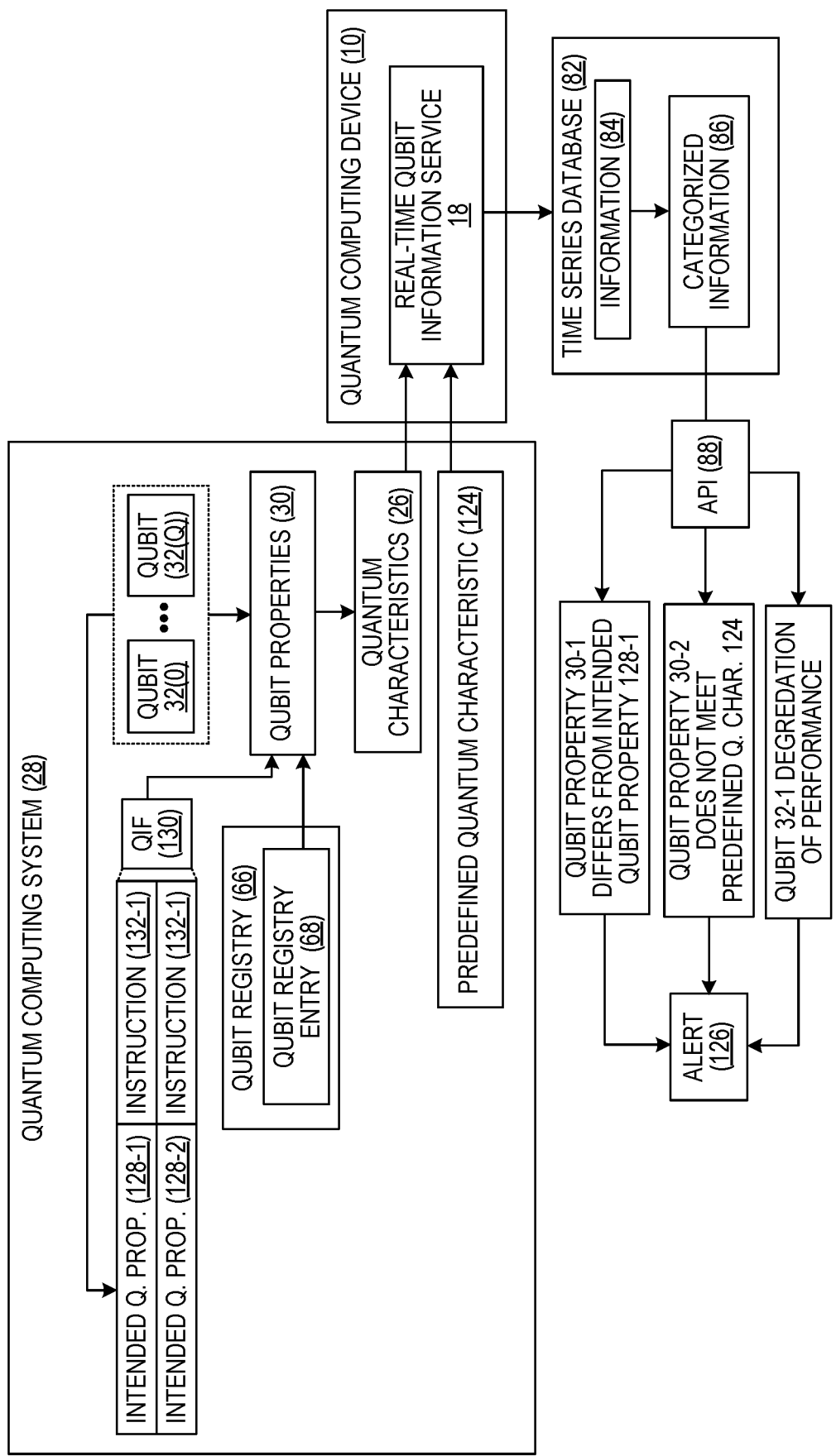
FIG. 5 is a block diagram of the quantum computing device of FIG. 1 for viewing real-time qubit information, according to one example.

FIG. 5 is a block diagram of the quantum computing device of FIG. 1 for viewing real-time qubit information, according to one example. Elements of FIG. 1 are referenced in describing FIG. 5 for the sake of clarity. In the example of FIG. 5, the real-time qubit information service 18 may, subsequent to obtaining the categorized information 86 from the time series database 82 via the API 88, determine that at least one property from among the qubit properties 30 of one or more of the qubits 32(0)-32(Q) of the quantum computing system 28 does not meet a predefined quantum characteristic 124. The real-time qubit information service 18 may then send an alert 126 that the at least one property from among the qubit properties 30 of one or more of the qubits 32(0)-32(Q) does not meet the predefined quantum characteristic 124. For example, the predefined quantum characteristic 124 may be that qubit 32-1 from the qubits 32(0)-32(Q) be in a particular position (e.g., position 38). The real-time qubit information service 18 can obtain the categorized information 86 from the time series database 82 and the categorized information 86 may identify the position 38 of the qubit 32-1 as one of the qubit properties 30 that corresponds to qubit 32-1. The real-time qubit information service 18 may compare the predefined quantum characteristic 124 for the qubit 32-2 position and the position 38 of the qubit 32-1 from the categorized information 86 and determine that the position 38 does not meet the predefined quantum characteristic 124 for the qubit 32-1. The real-time qubit information service 18 may then send an alert 126 or other notification or message that the position 38 of the qubit 32-1 does not meet the position expected from the predefined quantum characteristic 124 for the qubit 32-1.

In another example, the real-time qubit information service 18 may, subsequent to obtaining the categorized information 86 from the time series database 82 via the API 88, determine based on the categorized information 86 that a degradation in performance of at least one of the qubits 32(0)-32(Q) of the quantum computing system 28 exists. For example, the real-time qubit information service 18 can obtain the categorized information 86 from the time series database 82, and the categorized information 86 may identify the performance of the qubit 32-1 from among the qubits 32(0)-32(Q). The real-time qubit information service 18 may compare the performance of the qubit 32-1 that is identified in the categorized information 86 to a prior performance of the qubit 32-1 or an expected performance of the qubit 32-2, which can both be stored in the time series database 82, such as in the information 84. The real-time qubit information service 18 can determine that there has been a degradation of performance of the qubit 32-1 based on the comparison with the categorized information 86 when the prior performance of the qubit 32-1 was better than the performance of the qubit 32-1 as indicated in the categorized information 86. For example, a physical property of the qubit 32-1 may be different in the categorized information 86 from a prior or expected physical property of the qubit 32-1, and the difference in the physical property may indicate that there is a degradation of performance of the qubit 32-1.

In another example, the real-time qubit information service 18 may, subsequent to obtaining the categorized information 86 from the time series database 82 via the API 88, access the qubit registry 66 of the quantum computing system 28. The qubit registry 66 may be a component of a quantum computing device in the quantum computing system 28. The real-time qubit information service 18 may determine, based on the categorized information 86, that at least one property of a qubit from among the qubits 32(0)-32(Q) of the quantum computing system 28 is different from an intended property, such as intended qubit property 128-1 and intended qubit property 128-2, of the qubit.

The qubit registry entry 68 of the qubit registry 66 may correspond to a qubit from among the qubits 32(0)-32(Q) of the quantum computing system 28 and contain metadata that includes the physical properties of the qubit, such as the phase, polarization, position, relationship to other qubits, rotation, spin, state, or usage of the qubit, as non-limiting examples. The real-time qubit information service 18 can receive such information from the qubit registry entry 68 of the qubit registry 66.

The intended qubit property 128-1 and the intended qubit property 128-2 may each correspond to a qubit from among the qubits 32(0)-32(Q) of the quantum computing system 28. The categorized information 86 may include the intended properties (e.g., intended qubit property 128-1, intended qubit property 128-2) based on a quantum instruction file 130. The quantum instruction file 130 may include instructions, such as instruction 132-1 and instruction 132-2, that indicate the intended property (e.g., intended qubit property 128-1, intended qubit property 128-2) of a qubit from among the qubits 32(0)-32(Q) of the quantum computing system 28. For instance, when the real-time qubit information service 18 determines the quantum characteristics 26 of the quantum computing system 28, the real-time qubit information service 18 may identify instructions (e.g., instruction 132-1 and instruction 132-2) of the quantum instruction file 130 that indicate an intended property of one of the qubits 32(0)-32(Q), which can then be stored and categorized in the time series database 82 before being obtained by the real-time qubit information service 18 via the API 88.

With the information from the qubit registry 66 that a qubit of the quantum computing system 28 has particular physical properties and the categorized information 86 that includes the intended properties of the qubits, the real-time qubit information service 18 can determine, based on the information from the qubit registry entry 68 of the qubit registry 66 and the categorized information 86, that a property from among the qubit properties 30 is different from an intended property of that qubit. For example, the real-time qubit information service 18 may obtain the quantum instruction file 130, read the instruction 132-1 and intended qubit property 128-1 of the quantum instruction file 130 and determine, based on the intended qubit property 128-1 of the qubit 32-1 in the instruction 132-1, that the instruction 132-1 of the quantum instruction file 130 may intend to move qubit 32-1 into a specific polarity (e.g., polarization 36) when the quantum instruction file 130 is executed. The intended qubit property 128-1 can be stored and categorized in the time series database 82 as the categorized information 86. The real-time qubit information service 18 may also identify one or more properties (e.g., the qubit properties 30) of the qubit 32-1 from the qubit registry entry 68 of the qubit registry 66 of the quantum computing system 28. The qubit registry entry 68 that corresponds to qubit 32-1 may indicate that a property of the qubit 32-1 is that the qubit 32-1 is in a different polarity than the polarity identified in the intended qubit property 128-1 that has been stored in the time series database 82 as the categorized information 86.

Figure 6:
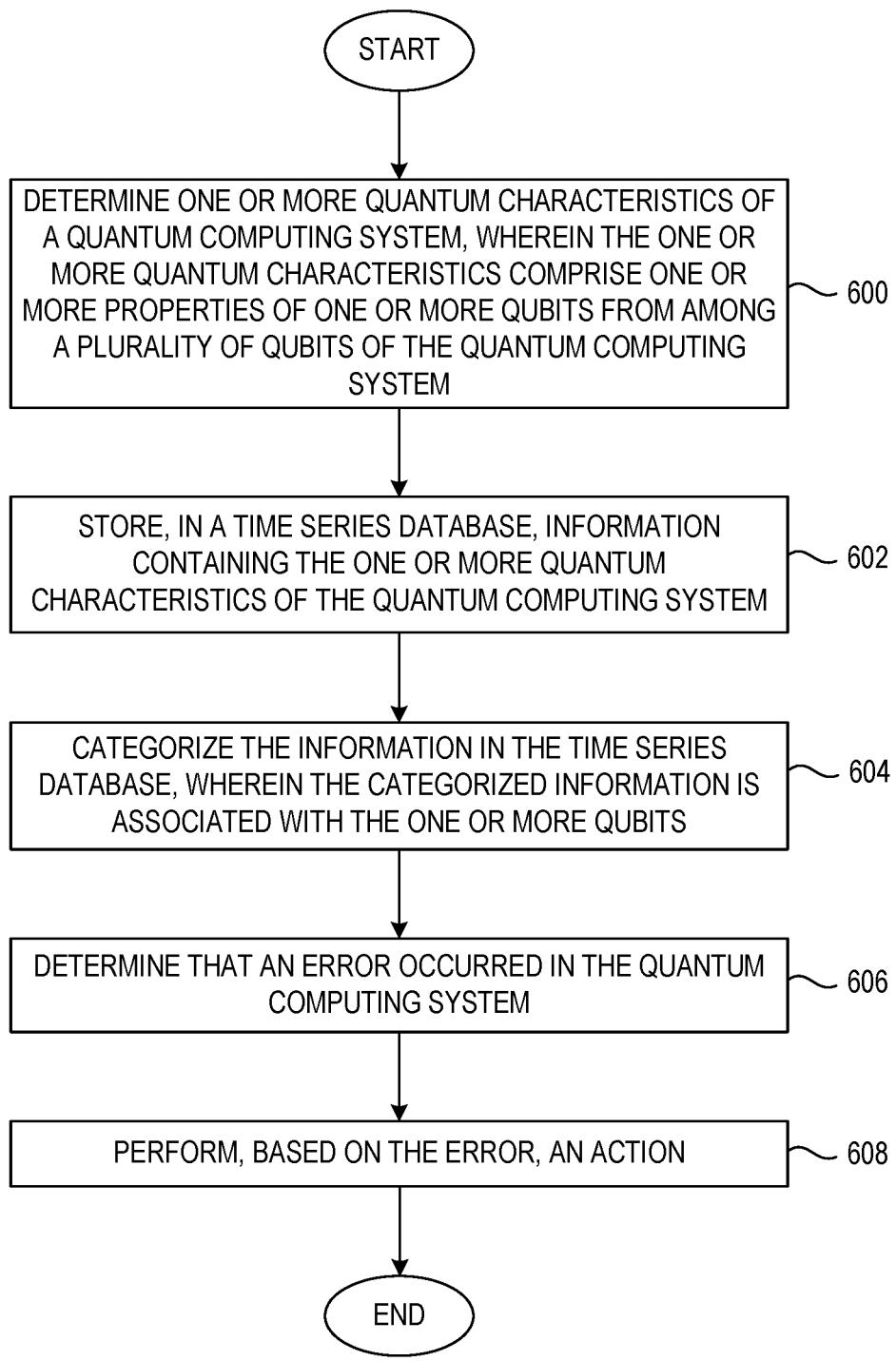
FIG. 6 is a flowchart illustrating operations performed by the quantum computing device of FIG. 1 for viewing real-time qubit information, according to one example.

FIG. 6 is a flowchart illustrating operations performed by the quantum computing device of FIG. 1 for viewing real-time qubit information, according to one example. Elements of FIG. 1 are referenced in describing FIG. 6 for the sake of clarity. In the example of FIG. 6, operations begin with a processor device of a quantum computing device, such as the processor device 14 of the quantum computing device 10 of FIG. 1, determining one or more quantum characteristics of a quantum computing system, wherein the one or more quantum characteristics comprise one or more properties of one or more qubits from among a plurality of qubits of the quantum computing system (block 600). The processor device 14 then stores, in a time series database, information containing the one or more quantum characteristics of the quantum computing system (block 602). The processor device 14 then categorizes the information in the time series database, wherein the categorized information is associated with the one or more qubits (block 604). The processor device 14 then determines that an error occurred in the quantum computing system (block 606). The processor device 14 then performs, based on the error, an action (block 608).

Figure 7:
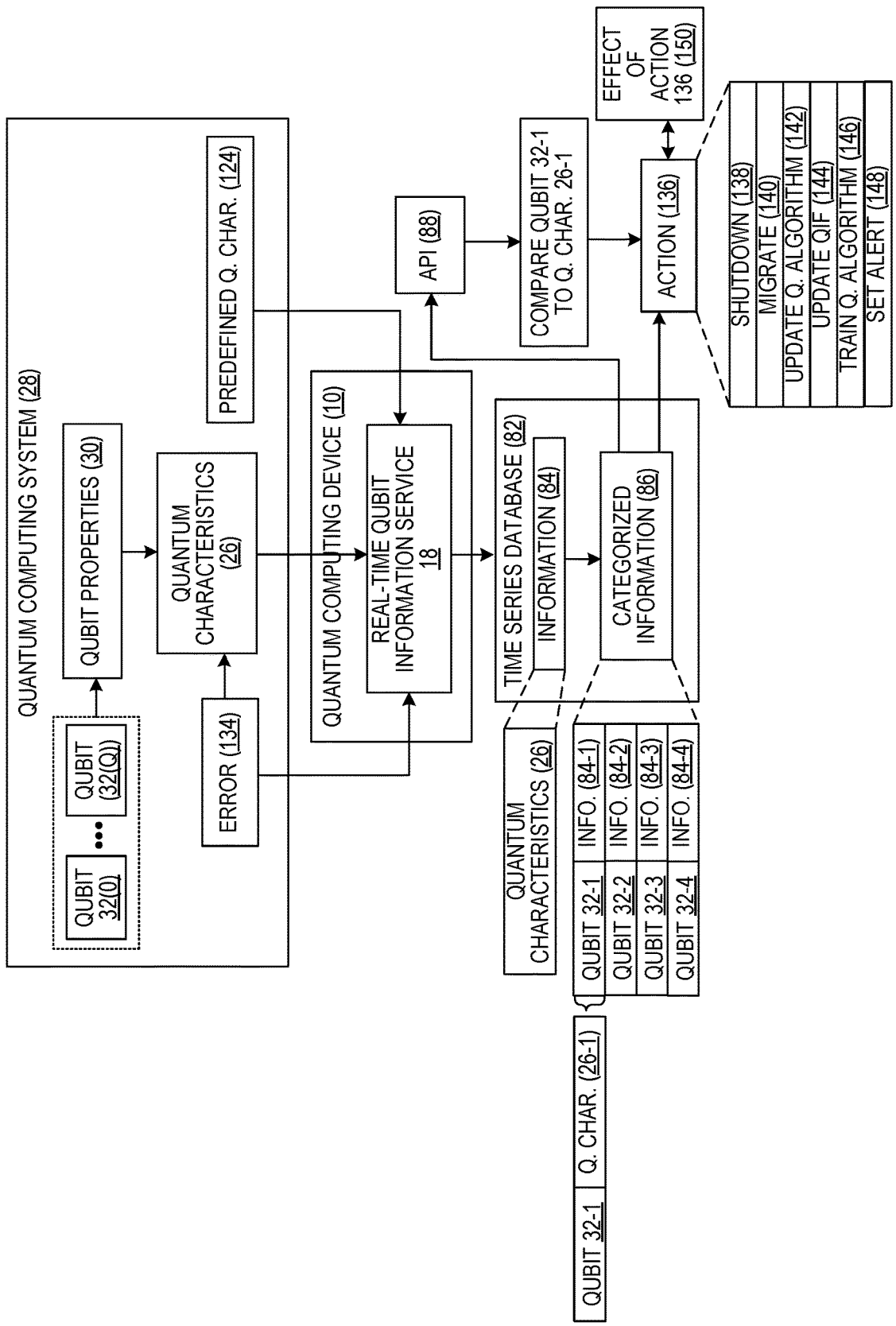
FIG. 7 is a block diagram of the quantum computing device of FIG. 1 for viewing real-time qubit information, according to one example.

FIG. 7 is a block diagram of the quantum computing device of FIG. 1 for viewing real-time qubit information, according to one example. Elements of FIG. 1 are referenced in describing FIG. 7 for the sake of clarity. In the example of FIG. 7, the real-time qubit information service 18 may determine the quantum characteristics 26 of the quantum computing system 28. The quantum characteristics 26 can include the qubit properties 30 of one or more of the qubits 32(0)-32(Q) of the quantum computing system 28. The real-time qubit information service 18 can store in the time series database 82 the information 84 that contains the quantum characteristics 26 of the quantum computing system 28. The real-time qubit information service 18 can then categorize the information 84 in the time series database 82, and the categorized information 86 can be associated with one or more of the qubits 32(0)-32(Q). The real-time qubit information service 18 can determine that an error 134 occurred in the quantum computing system 28 and perform, based on the error 134, an action 136. The action 136 can be performed automatically and may include a shutdown 138 of a component of the quantum computing system 28, a migration 140 of a component of the quantum computing system 28, an update to a quantum algorithm 142, an update 144 to a quantum instruction file, training a quantum algorithm 146, or setting an alert 148, as non-limiting examples. In particular, the alert 148 can be automatically set when at least one property of one or more of the qubits 32(0)-32(Q) of the quantum computing system 28 does not meet a predefined quantum characteristic 124 or moves outside a predefined threshold or range. The real-time qubit information service 18 can determine, based on the categorized information 86, an effect 150 of the action 136 on the quantum characteristics 26 of the quantum computing system 28 and perform, based on the effect 150, another action 136, such as the shutdown 138 of a component of the quantum computing system 28, the migration 140 of a component of the quantum computing system 28, the update to a quantum algorithm 142, the update 144 to the quantum instruction file, training the quantum algorithm 146, or setting the alert 148, as non-limiting examples. The action 136 performed based on the effect 150 can be the same as the action 136 that was performed earlier, or the action performed based on the effect 150 can be different from the action 136 that was performed earlier.

In some implementations, the real-time qubit information service 18 can be automatically turned on when an amount of errors, such as the error 134, are occurring in the quantum computing system 28 above a predetermined threshold. The real-time qubit information service 18 may also be automatically turned on on-demand based on the quantum characteristics 26 of the quantum computing system 28, such as existing quantum instruction file executions, failure rates, or a defined threshold, as non-limiting examples. In other implementations, the real-time qubit information service 18 may be available to some quantum services and unavailable to other quantum services. The real-time qubit information service 18 can also be turned on or off by the user of the quantum computing system 28. For example, the real-time qubit information service 18 may be turned on by a user or a computing system when training new quantum algorithms or turned on for all running algorithms. In another example, the real-time qubit information service 18 may be turned on when developing a development environment and may always be on in a production environment.

In another example, subsequent to determining that the error 134 occurred in the quantum computing system 28, the real-time qubit information service 18 can determine the quantum characteristics 26 of the quantum computing system 28 as a result of the error 134. The real-time qubit information service 18 can obtain the categorized information 86 from the time series database 82 via the API 88 and determine that there is a discrepancy between the categorized information 86 and the quantum characteristics 26 of the quantum computing system 28 as a result of the error 134. The real-time qubit information service 18 can then perform the action 136. In some examples, the real-time qubit information service 18 can determine that there is a discrepancy between the categorized information 86 and the quantum characteristics 26 of the quantum computing system 28 as a result of the error 134 by comparing the quantum characteristics 26 as a result of the error and the categorized information 86, which was stored in the time series database 82 before the error 134 occurred.

Figure 8:
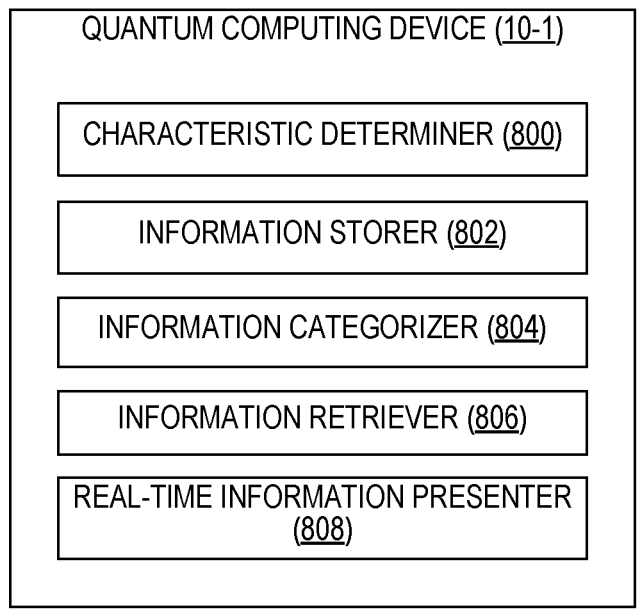
FIG. 8 is a block diagram of a quantum computing device suitable for implementing aspects illustrated in FIGS. 1-7 according to one example.

FIG. 8 is a block diagram of a quantum computing device 10-1 suitable for implementing aspects illustrated in FIGS. 1-7 according to one example. The quantum computing device 10-1 implements identical functionality as that described above with regard to the quantum computing device 10. The quantum computing device 10-1 includes a characteristic determiner 800 to determine one or more quantum characteristics of a quantum computing system, wherein the one or more quantum characteristics comprise one or more properties of one or more qubits from among a plurality of qubits of the quantum computing system. In some implementations, the characteristic determiner 800 determines one or more quantum characteristics of a quantum computing system by receiving from a qubit registry of a quantum computing device in the quantum computing system, the one or more properties of the one or more qubits of the quantum computing system. In some implementations, the characteristic determiner 800 determines one or more quantum characteristics of a quantum computing system by receiving the one or more quantum characteristics of the quantum computing system from one or more hardware APIs on one or more quantum computing devices in the quantum computing system. In some implementations, the characteristic determiner 800 determines one or more quantum characteristics of a quantum computing system by obtaining a quantum instruction file (QIF), and determining, based on the QIF, intended manipulations of the one or more qubits from among the plurality of qubits of the quantum computing system, wherein the one or more properties of the one or more qubits comprises the intended manipulations. In some implementations, the characteristic determiner 800 determines one or more quantum characteristics of a quantum computing system by obtaining, from a task manager of a quantum computing device in the quantum computing system, one or more processes of the quantum computing device, wherein the one or more processes indicate one or more locations in a lifecycle of execution of a quantum instruction file. The characteristic determiner 800 may comprise executable software instructions configured to program a processor device to implement the functionality of determining one or more quantum characteristics of a quantum computing system, wherein the one or more quantum characteristics comprise one or more properties of one or more qubits from among a plurality of qubits of the quantum computing system, may comprise circuitry including, by way of non-limiting example, an application-specific integrated circuit (ASIC), field-programmable gate array (FPGA), or may comprise a combination of executable software instructions and circuitry.

The quantum computing device 10-1 also includes an information storer 802 to store, in a time series database, information containing the one or more quantum characteristics of the quantum computing system. The information storer 802 may comprise executable software instructions configured to program a processor device to implement the functionality of storing, in a time series database, information containing the one or more quantum characteristics of the quantum computing system, may comprise circuitry including, by way of non-limiting example, an ASIC, FPGA, or may comprise a combination of executable software instructions and circuitry.

The quantum computing device 10-1 also includes an information categorizer 804 to categorize the information in the time series database, wherein the categorized information is associated with the one or more qubits. The information categorizer 804 may comprise executable software instructions configured to program a processor device to implement the functionality of categorizing the information in the time series database, wherein the categorized information is associated with the one or more qubits, may comprise circuitry including, by way of non-limiting example, an ASIC, FPGA, or may comprise a combination of executable software instructions and circuitry.

The quantum computing device 10-1 also includes an information retriever 806 to obtain from the time series database via an application programming interface (API), the categorized information. In some implementations, the information retriever 806 obtain from the time series database via an API by querying the time series database to retrieve the categorized information, and receiving the categorized information from the query to the time series database. The information retriever 806 may comprise executable software instructions configured to program a processor device to implement the functionality of obtaining, from the time series database via an application programming interface (API), the categorized information, may comprise circuitry including, by way of non-limiting example, an ASIC, FPGA, or may comprise a combination of executable software instructions and circuitry.

The quantum computing device 10-1 also includes a real-time information presenter 808 to present, on a display device, real-time information about the quantum computing system based on the categorized information. In some implementations, the real-time information presenter 808 presents, on a display device, real-time information about the quantum computing system based on the categorized information by creating a graph, wherein the graph displays one or more metrics of the one or more qubits of the quantum computing system. In some implementations, the real-time information presenter 808 presents, on a display device, real-time information about the quantum computing system based on the categorized information by presenting correlations in the categorized information, wherein the correlations in the categorized information comprise relationships between the plurality of qubits of the quantum computing system. In some implementations, the real-time information presenter 808 presents, on a display device, real-time information about the quantum computing system based on the categorized information by presenting a cause of an action that occurred in the quantum computing system and an effect of the action on the one or more properties of the one or more qubits from among the plurality of qubits of the quantum computing system. The real-time information presenter 808 may comprise executable software instructions configured to program a processor device to implement the functionality of presenting, on a display device, real-time information about the quantum computing system based on the categorized information, may comprise circuitry including, by way of non-limiting example, an ASIC, FPGA, or may comprise a combination of executable software instructions and circuitry.

Figure 9:
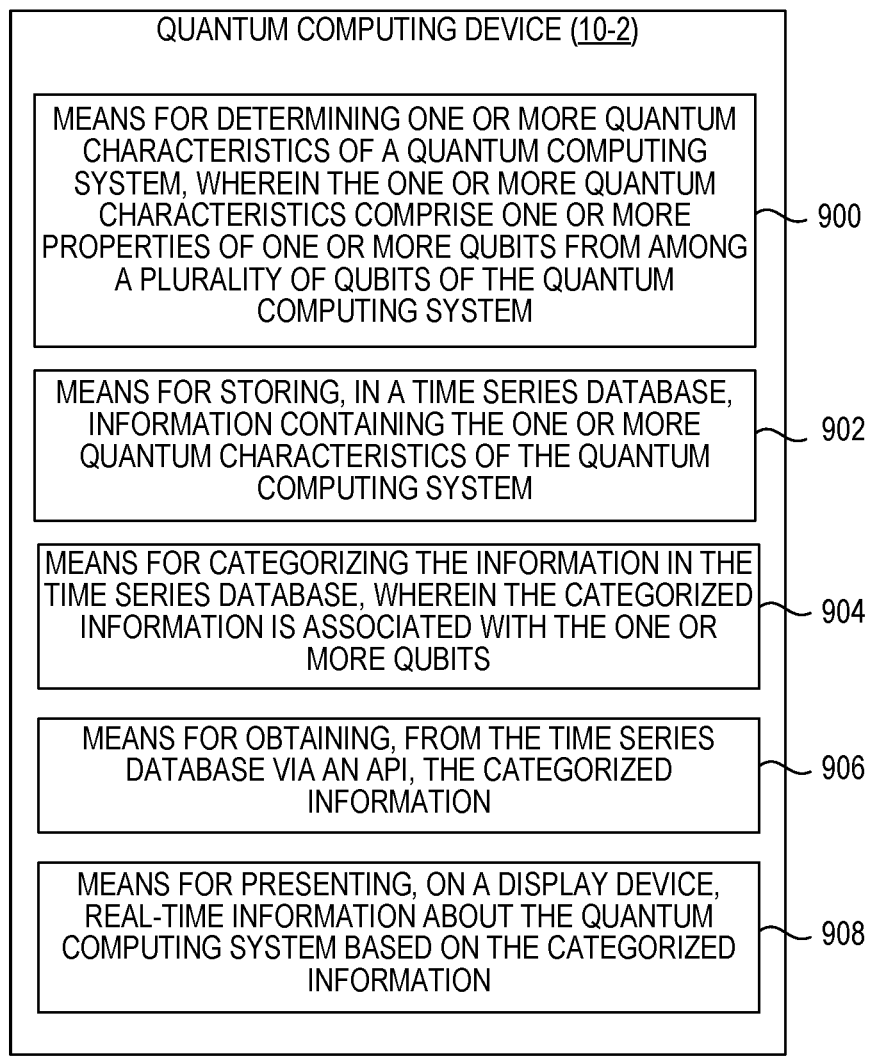
FIG. 9 is a block diagram of a quantum computing device suitable for viewing real-time qubit information, according to one example.

FIG. 9 is a block diagram of a quantum computing device 10-2 suitable for viewing real-time qubit information, according to one example. The quantum computing device 10-2 implements identical functionality as that described above with regard to the quantum computing device 10. In this implementation, the quantum computing device 10-2 includes a means 900 for determining one or more quantum characteristics of a quantum computing system, wherein the one or more quantum characteristics comprise one or more properties of one or more qubits from among a plurality of qubits of the quantum computing system. The means 900 may, in some implementations, receive from a qubit registry of a quantum computing device in the quantum computing system, the one or more properties of the one or more qubits of the quantum computing system. The means 900 may, in some implementations, receive the one or more quantum characteristics of the quantum computing system from one or more hardware APIs on one or more quantum computing devices in the quantum computing system. The means 900 may, in some implementations, obtain a quantum instruction file (QIF), and determine, based on the QIF, intended manipulations of the one or more qubits from among the plurality of qubits of the quantum computing system, wherein the one or more properties of the one or more qubits comprises the intended manipulations. The means 900 may, in some implementations, obtain from a task manager of a quantum computing device in the quantum computing system, one or more processes of the quantum computing device, wherein the one or more processes indicate one or more locations in a lifecycle of execution of a quantum instruction file. The means 900 may be implemented in any number of manners, including, for example via the characteristic determiner 800 illustrated in FIG. 8.

The quantum computing device 10-2 also includes a means 902 for storing, in a time series database, information containing the one or more quantum characteristics of the quantum computing system. The means 902 may be implemented in any number of manners, including, for example via the information storer 802 illustrated in FIG. 8.

The quantum computing device 10-2 also includes a means 904 for categorizing the information in the time series database, wherein the categorized information is associated with the one or more qubits. The means 904 may be implemented in any number of manners, including, for example via the information categorizer 804 illustrated in FIG. 8.

The quantum computing device 10-2 also includes a means 906 for obtaining from the time series database via an API, the categorized information. The means 906 may, in some implementations, query the time series database to retrieve the categorized information, and receive the categorized information from the query to the time series database. The means 906 may be implemented in any number of manners, including, for example via the information retriever 806 illustrated in FIG. 8.

The quantum computing device 10-2 also includes a means 908 for presenting, on a display device, real-time information about the quantum computing system based on the categorized information. The means 908 may, in some implementations, create a graph, wherein the graph displays one or more metrics of the one or more qubits of the quantum computing system. The means 908 may, in some implementations, present correlations in the categorized information, wherein the correlations in the categorized information comprise relationships between the plurality of qubits of the quantum computing system. The means 908 may, in some implementations, present a cause of an action that occurred in the quantum computing system and an effect of the action on the one or more properties of the one or more qubits from among the plurality of qubits of the quantum computing system. The means 908 may be implemented in any number of manners, including, for example via the real-time information presenter 808 illustrated in FIG. 8.

Figure 10:
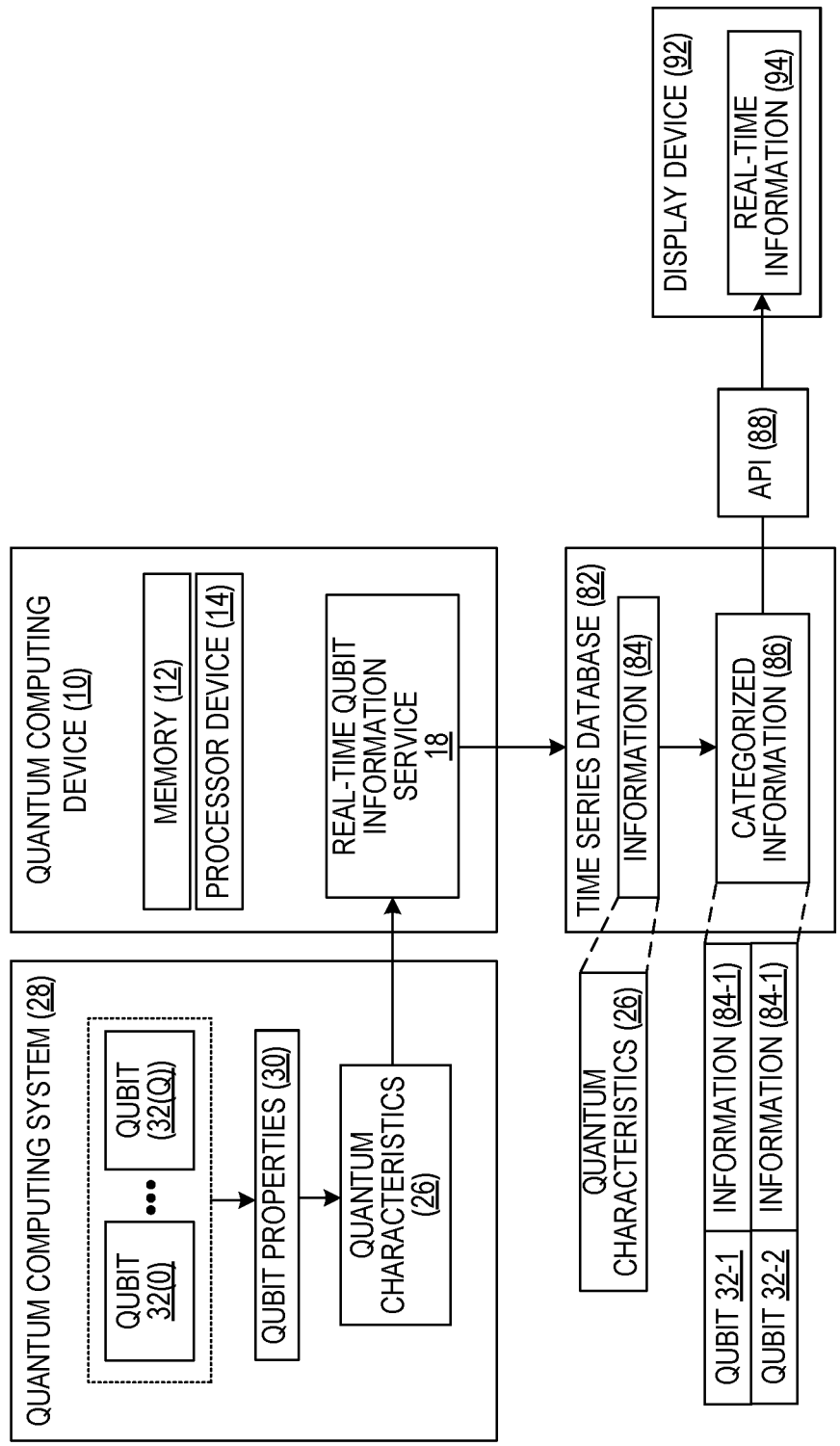
FIG. 10 is a block diagram of the quantum computing device of FIG. 1 for viewing real-time qubit information, according to one example.

FIG. 10 is a block diagram of the quantum computing device of FIG. 1 for viewing real-time qubit information, according to one example. Elements of FIG. 1 are referenced in describing FIG. 10 for the sake of clarity. In the example of FIG. 10, a quantum computing device 10 comprises a system memory 12 and a processor device 14 coupled to the system memory 12. The processor device 14 is to determine one or more quantum characteristics 26 of a quantum computing system 28, wherein the one or more quantum characteristics 26 comprise one or more properties 30 of one or more qubits from among a plurality of qubits 32(0)-32(Q) of the quantum computing system 28. The processor device 14 is further to store, in a time series database 82, information 84 containing the one or more quantum characteristics 26 of the quantum computing system 28. The processor device 14 is further to categorize the information 84 in the time series database 82, wherein the categorized information 86 is associated with the one or more qubits 32(0)-32(Q). The processor device 14 is further to obtain from the time series database 82 via an application programming interface (API) 88, the categorized information 86. The processor device 14 is further to present, on a display device 92, real-time information 94 about the quantum computing system 28 based on the categorized information 86.

Figure 11:
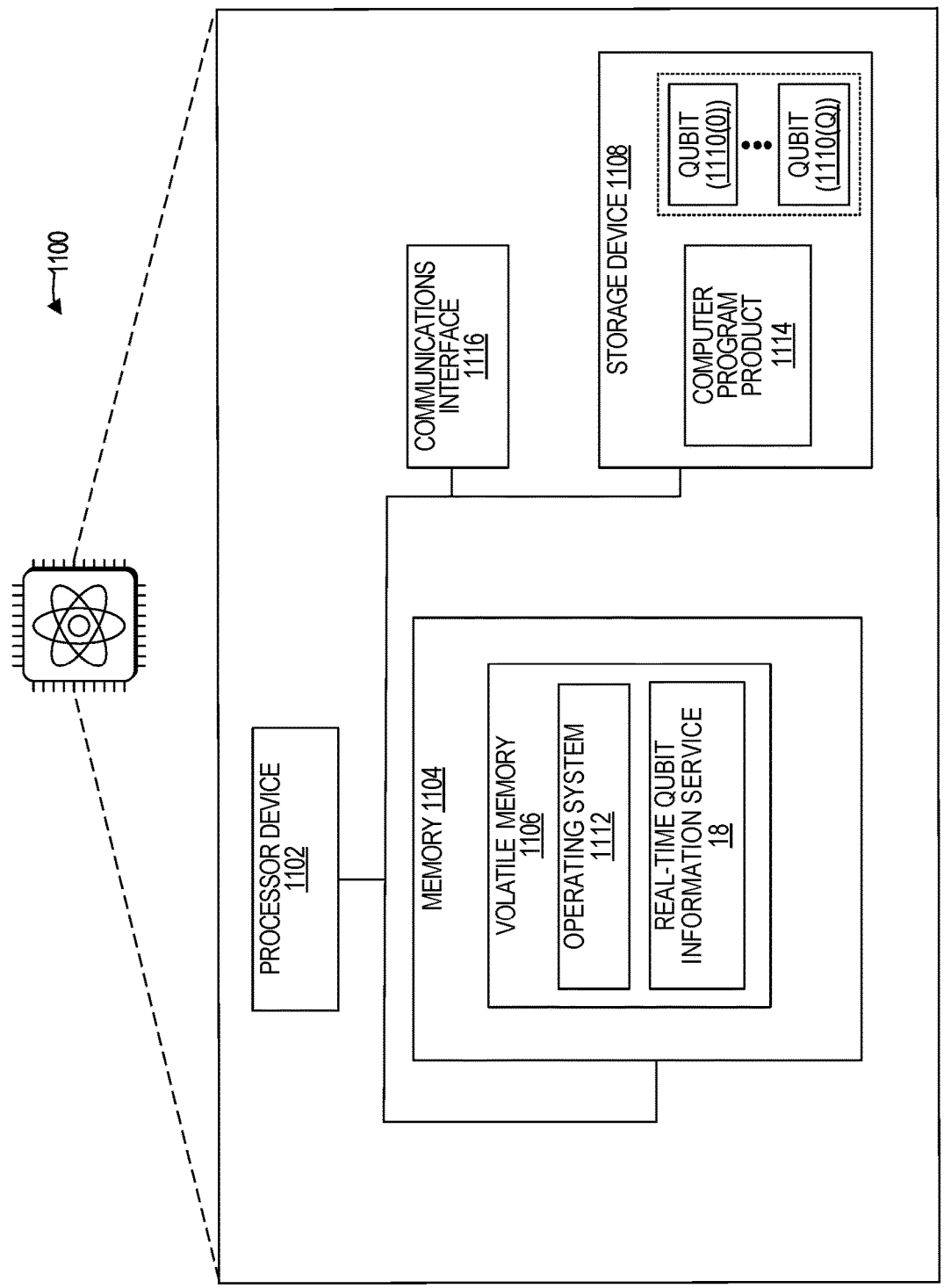
FIG. 11 is a block diagram of a quantum computing device suitable for implementing examples, according to one example.

FIG. 11 is a block diagram of a quantum computing device 1100, such as the quantum computing device 10 of FIG. 1, suitable for implementing examples, according to one example. The quantum computing device 1100 may comprise any suitable quantum computing device or devices. The quantum computing device 1100 can operate using classical computing principles or quantum computing principles. Thus, in some implementations, portions of the quantum computing device 1100 (e.g., the real-time qubit information service 18) may be executed using classical computing components and/or algorithms. When using quantum computing principles, the quantum computing device 1100 performs computations that utilize quantum-mechanical phenomena, such as superposition and entanglement. The quantum computing device 1100 may operate under certain environmental conditions, such as at or near zero degrees) (0°) Kelvin. When using classical computing principles, the quantum computing device 1100 utilizes binary digits that have a value of either zero (0) or one (1).

The quantum computing device 1100 includes a processor device 1102, such as the processor device 14, and a system memory 1104, such as the system memory 12. The processor device 1102 can be any commercially available or proprietary processor suitable for operating in a quantum environment. The system memory 1104 may include volatile memory 1106 (e.g., random-access memory (RAM)).

The quantum computing device 1100 may further include or be coupled to a non-transitory computer-readable medium such as a storage device 1108, such as the storage device 16. The storage device 1108 may comprise, for example, an internal or external hard disk drive (HDD) (e.g., enhanced integrated drive electronics (EIDE) or serial advanced technology attachment (SATA)) for storage, memory, or the like. The storage device 1108 and other drives associated with computer-readable media and computer-usable media may provide non-volatile storage of data, data structures, computer-executable instructions, and the like. The storage device may also provide functionality for storing one or more qubits 1110(0)-1110(Q).

A number of modules can be stored in the storage device 1108 and in the volatile memory 1106, including an operating system 1112 and one or more modules, such as the real-time qubit information service 18. All or a portion of the examples may be implemented as a computer program product 1114 stored on a transitory or non-transitory computer-usable or computer-readable medium, such as the storage device 1108, which includes complex programming instructions, such as complex computer-readable program code, to cause the processor device 1102 to carry out the steps described herein. Thus, the computer-readable program code can comprise computer-executable instructions for implementing the functionality of the examples described herein when executed on the processor device 1102.

An operator may also be able to enter one or more configuration commands through a keyboard (not illustrated), a pointing device such as a mouse (not illustrated), or a touch-sensitive surface such as a display device (not illustrated). The quantum computing device 1100 may also include a communications interface 1116 suitable for communicating with other quantum computing systems, including, in some implementations, classical computing devices.

Other computer system designs and configurations may also be suitable to implement the systems and methods described herein. The following examples illustrate various implementations in accordance with one or more aspects of the disclosure.

Example 1 is a method comprising determining, by a quantum computing device, one or more quantum characteristics of a quantum computing system, wherein the one or more quantum characteristics comprise one or more properties of one or more qubits from among a plurality of qubits of the quantum computing system; storing, by the quantum computing device in a time series database, information containing the one or more quantum characteristics of the quantum computing system; categorizing, by the quantum computing device, the information in the time series database, wherein the categorized information is associated with the one or more qubits; determining, by the quantum computing device, that an error occurred in the quantum computing system; and performing, by the quantum computing device based on the error, an action.

Example 2 is the method of example 1 wherein the action comprises one or more of automatically, by the quantum computing device, shutting down a component of the quantum computing system, migrating a component of the quantum computing system, updating a quantum algorithm, updating a quantum instruction file, and training a quantum algorithm.

Example 3 is the method of example 1 further comprising subsequent to determining, by the quantum computing device, that an error occurred in the quantum computing system, determining, by the quantum computing device, one or more quantum characteristics of the quantum computing system as a result of the error; obtaining, by the quantum computing device from the time series database via an API, the categorized information; determining, by the quantum computing device, a discrepancy between the categorized information and the one or more quantum characteristics of the quantum computing system as a result of the error; and performing, by the quantum computing device based on the discrepancy, an action.

Example 4 is the method of example 3 wherein determining, by the quantum computing device, a discrepancy between the categorized information and the one or more quantum characteristics of the quantum computing system as a result of the error comprises comparing, by the quantum computing device, the one or more quantum characteristics of the quantum computing system as a result of the error and the categorized information.

Example 5 is the method of example 1 further comprising determining, by the quantum computing device based on the categorized information, an effect of the action on the one or more quantum characteristics of the quantum computing system; and performing, by the quantum computing device based on the effect, an action.

Example 6 is the method of example 1 wherein the action comprises automatically setting an alert when at least one property of the one or more qubits from among the plurality of qubits of the quantum computing system does not meet a predefined characteristic.

Example 7 is a quantum computing device that includes a memory and a processor device coupled to the memory. The processor device is to determine one or more quantum characteristics of a quantum computing system, wherein the one or more quantum characteristics comprise one or more properties of one or more qubits from among a plurality of qubits of the quantum computing system; store, in a time series database, information containing the one or more quantum characteristics of the quantum computing system; categorize the information in the time series database, wherein the categorized information is associated with the one or more qubits; determine that an error occurred in the quantum computing system; and perform, based on the error, an action.

Example 8 is the quantum computing device of example 7 wherein the action comprises one or more of automatically, by the quantum computing device, shutting down a component of the quantum computing system, migrating a component of the quantum computing system, updating a quantum algorithm, updating a quantum instruction file, and training a quantum algorithm.

Example 9 is the quantum computing device of example 7 wherein the processor device is further to subsequent to determine that an error occurred in the quantum computing system, determine one or more quantum characteristics of the quantum computing system as a result of the error; obtain, from the time series database via an API, the categorized information; determine a discrepancy between the categorized information and the one or more quantum characteristics of the quantum computing system as a result of the error; and perform, based on the discrepancy, an action.

Example 10 is the quantum computing device of example 9 wherein to determine a discrepancy between the categorized information and the one or more quantum characteristics of the quantum computing system as a result of the error, the processor device is further to compare the one or more quantum characteristics of the quantum computing system as a result of the error and the categorized information.

Example 11 is the quantum computing device of example 7 wherein the processor device is further to determine, based on the categorized information, an effect of the action on the one or more quantum characteristics of the quantum computing system; and perform, based on the effect, an action.

Example 12 is the quantum computing device of example 7 wherein the action comprises automatically setting an alert when at least one property of the one or more qubits from among the plurality of qubits of the quantum computing system does not meet a predefined characteristic.

Example 13 is a non-transitory computer-readable storage medium that includes computer-executable instructions that, when executed, cause one or more processor devices to determine one or more quantum characteristics of a quantum computing system, wherein the one or more quantum characteristics comprise one or more properties of one or more qubits from among a plurality of qubits of the quantum computing system; store, in a time series database, information containing the one or more quantum characteristics of the quantum computing system; categorize the information in the time series database, wherein the categorized information is associated with the one or more qubits; determine that an error occurred in the quantum computing system; and perform, based on the error, an action.

Example 14 is the non-transitory computer-readable storage medium of example 13 wherein the action comprises one or more of automatically, by the quantum computing device, shutting down a component of the quantum computing system, migrating a component of the quantum computing system, updating a quantum algorithm, updating a quantum instruction file, and training a quantum algorithm.

Example 15 is the non-transitory computer-readable storage medium of example 13 wherein the instructions are further to cause the processor device to subsequent to determine that an error occurred in the quantum computing system, determine one or more quantum characteristics of the quantum computing system as a result of the error; obtain, from the time series database via an API, the categorized information; determine a discrepancy between the categorized information and the one or more quantum characteristics of the quantum computing system as a result of the error; and perform, based on the discrepancy, an action.

Example 16 is the non-transitory computer-readable storage medium of example 15 wherein to determine a discrepancy between the categorized information and the one or more quantum characteristics of the quantum computing system as a result of the error, the instructions are further to cause the processor device to compare the one or more quantum characteristics of the quantum computing system as a result of the error and the categorized information.

Example 17 is the non-transitory computer-readable storage medium of example 13 wherein the instructions are further to cause the processor device to determine, based on the categorized information, an effect of the action on the one or more quantum characteristics of the quantum computing system; and perform, based on the effect, an action.

Example 18 is the non-transitory computer-readable storage medium of example 13 wherein the action comprises automatically setting an alert when at least one property of the one or more qubits from among the plurality of qubits of the quantum computing system does not meet a predefined characteristic.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a quantum computing device, one or more quantum characteristics of a quantum computing system, wherein the one or more quantum characteristics comprise one or more properties of one or more qubits from among a plurality of qubits of the quantum computing system;
   storing, by the quantum computing device in a time series database, information containing the one or more quantum characteristics of the quantum computing system;

categorizing, by the quantum computing device, the information in the time series database, wherein the categorized information is associated with the one or more qubits;

obtaining, by the quantum computing device from the time series database via an application programming interface (API), the categorized information; and presenting, by the quantum computing device on a display device, real-time information about the quantum computing system based on the categorized information.

2. The method of claim 1, further comprising determining, by the quantum computing device, that an action occurred in the quantum computing system, wherein the information in the time series database contains one or more properties of the one or more qubits as a result of the action.

3. The method of claim 2, wherein the action is one or more of a coding error, a collision error, a gating error, a logical error, a human error, a gating operation, a quantum algorithm execution, and a quantum instruction file execution.

4. The method of claim 2, further comprising:
receiving, by the quantum computing device, an error code corresponding to the action;
obtaining, by the quantum computing device from the time series database via the API, the categorized information; and
determining, by the quantum computing device based on the categorized information and the error code, one or more quantum characteristics of the quantum computing system that the error code corresponds to.

5. The method of claim 1, wherein determining the one or more quantum characteristics of the quantum computing system comprises receiving, from a qubit registry of a quantum computing device in the quantum computing system, the one or more properties of the one or more qubits of the quantum computing system.

6. The method of claim 1, wherein determining the one or more quantum characteristics of the quantum computing system comprises receiving the one or more quantum characteristics of the quantum computing system from one or more hardware APIs on one or more quantum computing devices in the quantum computing system.

7. The method of claim 1, wherein determining the one or more quantum characteristics of the quantum computing system comprises:
obtaining a quantum instruction file (QIF); and
determining, based on the QIF, intended manipulations of the one or more qubits from among the plurality of qubits of the quantum computing system, wherein the one or more properties of the one or more qubits comprises the intended manipulations.

8. The method of claim 1, wherein determining the one or more quantum characteristics of a quantum computing system comprises obtaining, from a task manager of a quantum computing device in the quantum computing system, one or more processes of the quantum computing device, wherein the one or more processes indicate one or more locations in a lifecycle of execution of a quantum instruction file.

9. The method of claim 1, wherein the one or more quantum characteristics of the quantum computing system includes one or more of errors, error correction, gate operations, heat, noise, quantum instruction file executions, quantum services running, T1 times, T2 times.

10. The method of claim 1, wherein the one or more properties of the one or more qubits from among the plurality of qubits of the quantum computing system comprise one or more of phase, polarization, position, relationships, rotation, spin, state, and usage of each qubit from among the plurality of qubits of the quantum computing system.

11. The method of claim 1, wherein obtaining, from the time series database via the API, the categorized information comprises:
querying the time series database to retrieve the categorized information; and
receiving the categorized information from the query to the time series database.

12. The method of claim 1, wherein presenting, on the display device, the real-time information about the quantum computing system based on the categorized information comprises creating, by the quantum computing device, a graph, wherein the graph displays one or more metrics of the one or more qubits of the quantum computing system.

13. The method of claim 1, wherein presenting, on the display device, the real-time information about the quantum computing system based on the categorized information comprises presenting correlations in the categorized information, wherein the correlations in the categorized information comprise relationships between the plurality of qubits of the quantum computing system.

14. The method of claim 1, wherein presenting, on the display device, the real-time information about the quantum computing system based on the categorized information comprises presenting a cause of an action that occurred in the quantum computing system and an effect of the action on the one or more properties of the one or more qubits from among the plurality of qubits of the quantum computing system.

15. The method of claim 1, further comprising:
subsequent to obtaining, from the time series database via the API, the categorized information, determining, by the quantum computing device, that at least one property of the one or more qubits from among the plurality of qubits of the quantum computing system does not meet a predefined quantum characteristic; and
sending, by the quantum computing device, an alert that the at least one property of the one or more qubits does not meet the predefined quantum characteristic.

16. The method of claim 1, further comprising, subsequent to obtaining, from the time series database via the API, the categorized information, determining, by the quantum computing device based on the categorized information, that a degradation of performance of at least one of the one or more qubits from among the plurality of qubits of the quantum computing system exists.

17. The method of claim 1, further comprising:
subsequent to obtaining, from the time series database via the API, the categorized information, accessing, by the quantum computing device, a qubit registry of a quantum computing device in the quantum computing system; and
determining, by the quantum computing device based on the categorized information and the qubit registry, that at least one property of a qubit from among the plurality of qubits of the quantum computing system is different from an intended property of the qubit, wherein the categorized information includes the intended property of the qubit based on a quantum instruction file comprising instructions that indicate the intended property of the qubit.

18. A quantum computing device, comprising:
a memory device; and
a processor device coupled to the memory, the processor device to:

determine one or more quantum characteristics of a quantum computing system, wherein the one or more quantum characteristics comprise one or more properties of one or more qubits from among a plurality of qubits of the quantum computing system;

store, in a time series database, information containing the one or more quantum characteristics of the quantum computing system;

categorize the information in the time series database, wherein the categorized information is associated with the one or more qubits;

obtain, from the time series database via an application programming interface (API), the categorized information; and present, on a display device, real-time information about the quantum computing system based on the categorized information.

19. The quantum computing device claim 18, wherein the processor device is further to determine that an action occurred in the quantum computing system, wherein the information in the time series database contains one or more properties of the one or more qubits as a result of the action.

20. A non-transitory computer-readable storage medium that includes computer-executable instructions that, when executed, cause one or more processor devices to:

determine one or more quantum characteristics of a quantum computing system, wherein the one or more quantum characteristics comprise one or more properties of one or more qubits from among a plurality of qubits of the quantum computing system;

store, in a time series database, information containing the one or more quantum characteristics of the quantum computing system;

categorize the information in the time series database, wherein the categorized information is associated with the one or more qubits;

obtain, from the time series database via an application programming interface (API), the categorized information; and present, on a display device, real-time information about the quantum computing system based on the categorized information.

\* \* \* \* \*